(12) United States Patent
Sekido et al.

(10) Patent No.: US 12,446,757 B2
(45) Date of Patent: Oct. 21, 2025

(54) IMAGE PICKUP UNIT AND ENDOSCOPE

(71) Applicant: OLYMPUS MEDICAL SYSTEMS CORP., Tokyo (JP)

(72) Inventors: Takanori Sekido, Sagamihara (JP); Shuichi Takie, Hachioji (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 0 days.

(21) Appl. No.: 18/748,387

(22) Filed: Jun. 20, 2024

(65) Prior Publication Data

US 2024/0341574 A1  Oct. 17, 2024

Related U.S. Application Data

(63) Continuation of application No. PCT/JP2022/018865, filed on Apr. 26, 2022.

(51) Int. Cl.
*A61B 18/14* (2006.01)
*A61B 1/00* (2006.01)
*A61B 1/05* (2006.01)

(52) U.S. Cl.
CPC ...... *A61B 1/00131* (2013.01); *A61B 1/00013* (2013.01); *A61B 1/053* (2013.01)

(58) Field of Classification Search
CPC . A61B 1/00131; A61B 1/00013; A61B 1/053; A61B 1/0011; A61B 1/051; H04N 23/54
See application file for complete search history.

(56) References Cited

U.S. PATENT DOCUMENTS

| | | | |
|---|---|---|---|
| 2002/0095152 A1* | 7/2002 | Ciarrocca | A61B 18/1492 606/50 |
| 2012/0323078 A1* | 12/2012 | Kikumori | B29C 45/0025 600/176 |
| 2020/0008658 A1* | 1/2020 | Hayakawa | A61B 1/0011 |
| 2020/0049972 A1* | 2/2020 | Igarashi | G02B 23/2484 |
| 2020/0333581 A1* | 10/2020 | Kobayashi | G02B 23/2423 |
| 2020/0352415 A1* | 11/2020 | Harris | A61B 90/70 |
| 2021/0096355 A1* | 4/2021 | Nishimura | H04N 23/55 |
| 2021/0219830 A1* | 7/2021 | Nakagawa | A61B 1/051 |
| 2021/0288023 A1* | 9/2021 | Kobayashi | H10F 39/811 |

FOREIGN PATENT DOCUMENTS

| | | |
|---|---|---|
| EP | 2546043 A1 | 1/2013 |
| JP | 2005157253 A | 6/2005 |
| JP | 2014089334 A | 5/2014 |
| JP | 6013657 B1 | 10/2016 |
| WO | 2011111242 A1 | 9/2011 |
| WO | 2018180554 A1 | 10/2018 |
| WO | 2019207650 A1 | 10/2019 |

OTHER PUBLICATIONS

International Search Report dated Jul. 19, 2022 received in PCT/JP2022/018865.

* cited by examiner

*Primary Examiner* — Howard D Brown, Jr.
(74) *Attorney, Agent, or Firm* — Scully, Scott, Murphy & Presser, P.C.

(57) ABSTRACT

An image pickup unit includes: an image pickup device, a first wiring board bonded to the image pickup device; and a second wiring board bonded to the first wiring board and including a gate remnant in a back area of the second wiring board.

14 Claims, 6 Drawing Sheets

IMAGE PICKUP UNIT AND ENDOSCOPE

CROSS-REFERENCE TO RELATED APPLICATION

This application is a continuation application of PCT/JP2022/018865 filed on Apr. 26, 2022, the entire contents of which are incorporated herein by this reference.

BACKGROUND OF THE INVENTION

1. Field of the Invention

The present disclosure relates to an image pickup unit including a plurality of wiring boards and an endoscope including the image pickup unit including the plurality of wiring boards.

2. Description of the Related Art

An image pickup signal outputted from an image pickup device disposed at a distal end portion of an endoscope is transmitted via a plurality of wiring boards.

Japanese Patent No. 6013657 discloses an image pickup unit including a first wiring board solder-bonded to a rear surface of an image pickup device, a second wiring board to which the first wring board is solder-bonded, and a plurality of signal cables connected to the second wiring board. The second wiring board is an irregularly-shaped wiring board having a complicated shape for enabling efficient connection of the plurality of signal cables.

SUMMARY OF THE INVENTION

An image pickup unit according to an embodiment includes: an image pickup device including a light-receiving surface located on a front side and a rear surface located on a back side, and a plurality of external electrodes disposed on the rear surface; a first wiring board including a first surface located on a front side and a second surface located on a back side, the first wiring board including a plurality of first electrodes disposed on the first surface, and a plurality of second electrodes disposed on the second surface, the plurality of first electrodes being bonded respectively to the plurality of external electrodes; and a second wiring board including a third surface located on a front side and a fourth surface located on a back side, the second wiring board including a plurality of third electrodes disposed on the third surface, and a gate remnant located in a back area of the second wiring board, the plurality of third electrodes being bonded respectively to the plurality of second electrodes.

An endoscope according to an embodiment includes: an insertion portion configured to be inserted into a subject; and an image pickup unit provided at a distal end portion of the insertion portion. The image pickup unit includes: an image pickup device including a light-receiving surface located on a front side and a rear surface located on a back side, and a plurality of external electrodes disposed on the rear surface; a first wiring board including a first surface located on a front side and a second surface located on a back side, the first wiring board including a plurality of first electrodes disposed on the first surface, and a plurality of second electrodes disposed on the second surface, the plurality of first electrodes being bonded respectively to the plurality of external electrodes; and a second wiring board including a third surface located on a front side and a fourth surface located on a back side, the second wiring board including a plurality of third electrodes disposed on the third surface, and a gate remnant located in a back area of the second wiring board, the plurality of third electrodes being bonded respectively to the plurality of second electrodes.

DETAILED DESCRIPTION OF THE PREFERRED EMBODIMENT(S)

First Embodiment

Figure 1:
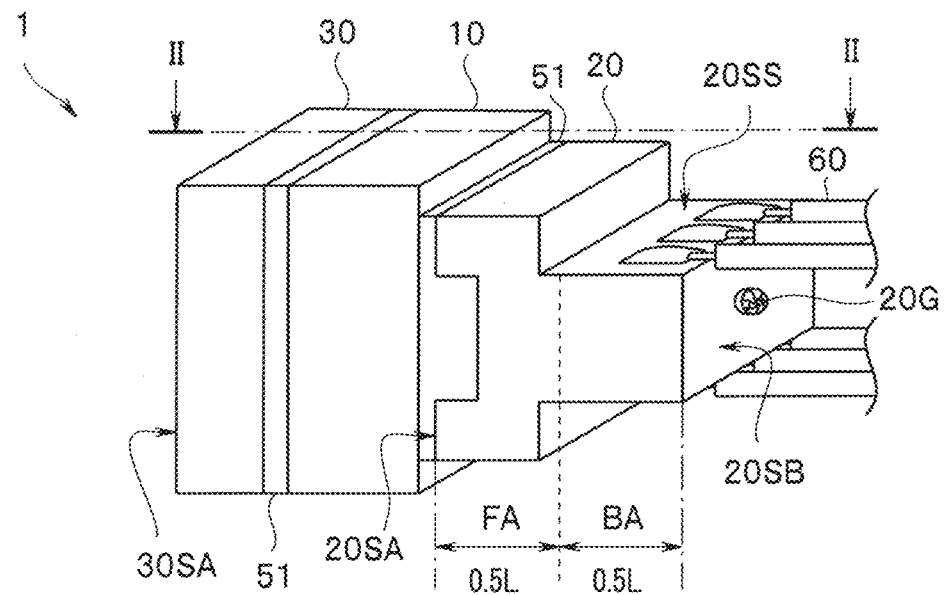
FIG. 1 is a perspective view of an image pickup unit according to a first embodiment.
Figure 2:
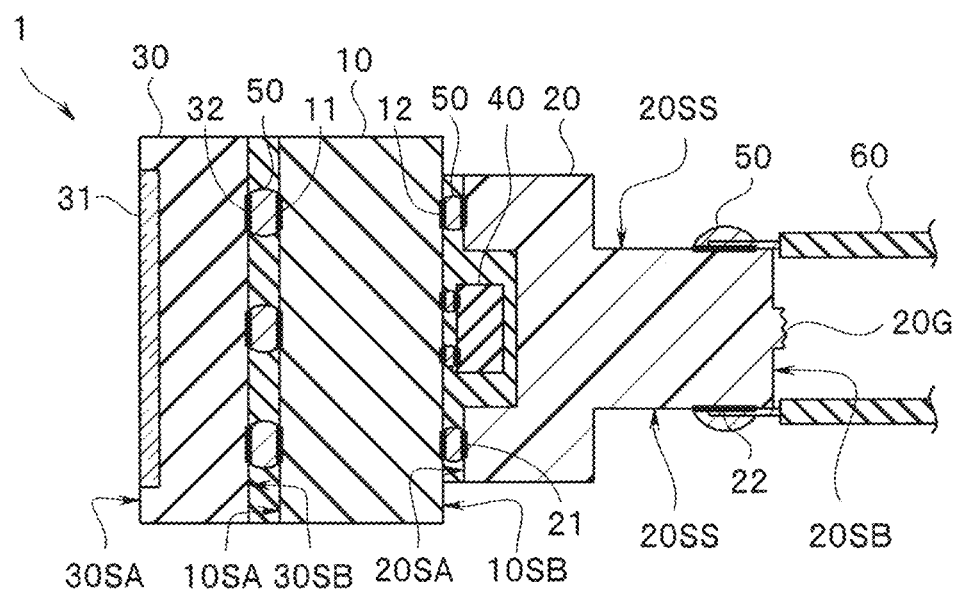
FIG. 2 is a sectional view taken along the line II-II in FIG. 1.
Figure 3:
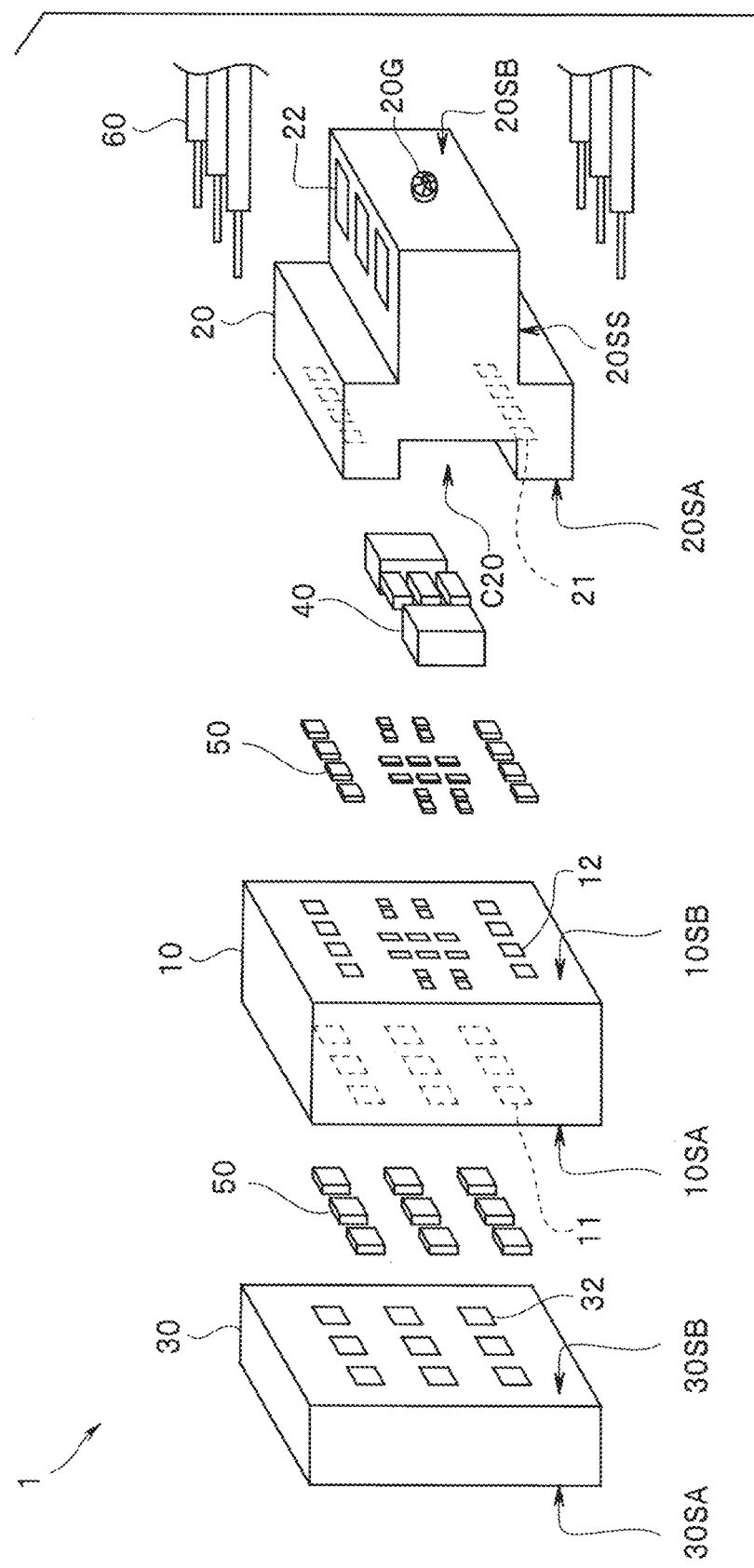
FIG. 3 is a perspective exploded view of the image pickup unit according to the first embodiment.

An image pickup unit 1 according to the present embodiment shown in FIGS. 1 to 3 includes a first wiring board 10, a second wiring board 20, an image pickup device 30, and a plurality of signal cables 60.

Note that the drawings based on each embodiment are schematic. The relationship between thicknesses and widths of respective parts, a ratio of a thickness of a certain part to that of another part, a relative angle and the like of the respective parts are different from the actual ones. The respective drawings include parts in which the relationships and ratios among the dimensions are different. Illustration and addition of reference signs to some constituent elements will be omitted. The term "front" refers to the direction in which a light-receiving surface 30SA of the image pickup device 30 faces and the term "back" refers to a direction opposite to the "front". When an image of an object is picked up with an endoscope, the direction of the object is front, and the direction opposite to the front is back.

The image pickup unit 1 according to the present embodiment shown in FIGS. 1 to 3 is configured such that the image pickup device 30, the first wiring board 10, and the second wiring board 20 are connected in this order from the front side to the back side.

The image pickup device 30 has a light-receiving surface 30SA located on the front side thereof, and a rear surface 30SB located on a side (back side) opposite to the light-receiving surface 30SA. On the light-receiving surface 30SA of the image pickup device 30 composed of a semiconductor such as silicon, a light-receiving circuit 31 constituted of a CCD or a CMOS is formed, for example. The light-receiving circuit 31 is connected to a plurality of external electrodes 32 on the rear surface 30SB, via a plurality of through electrodes (not shown). The image pickup device 30 may be a surface irradiation type image sensor or a rear surface irradiation type image sensor. Although not shown, a cover glass and an image pickup optical system are disposed on the light-receiving surface 30SA.

The first wiring board 10 includes a first surface 10SA located on the front side thereof, and a second surface 10SB located on a side (back side) opposite to the first surface 10SA. The first wiring board 10 is a ceramic stacked wiring board fabricated by stacking a plurality of unfired ceramic sheets each having a front wiring and a through wiring and thereafter firing the plurality of stacked ceramic sheets.

A plurality of first electrodes 11 on the first surface 10SA are bonded respectively to the plurality of external electrodes 32 of the image pickup device 30. A plurality of second electrodes 12 are disposed on the second surface 10SB.

The second wiring board 20 includes a third surface 20SA located on the front side thereof, and a fourth surface 20SB located on a side (back side) opposite to the third surface 20SA. The second wiring board 20 is an irregularly-shaped wiring board in which the fourth surface 20SB is smaller than the third surface 20SA. A plurality of third electrodes 21 disposed on the third surface 20SA are bonded respectively to the plurality of second electrodes 12 of the first wiring board 10.

The image pickup device 30, the first wiring board 10, and the second wiring board are electrically connected by a plurality of solders 50, for example. The image pickup device 30 and the first wiring board 10 may be bonded to each other such that the electrodes whose surfaces are made of gold are bonded by a thermal ultrasonic bonding method for applying heat together with ultrasound.

A sealing resin 51 is disposed around the solders 50 on the bonding surfaces. As the sealing resin 51, an epoxy resin, a polyimide resin, a fluororesin, polyamideimide, polyphenylene ether, polypropylene, polysulfone, polyethersulfone, polyetheretherketone, polyetherketone, polyetherimide, fluorine thermoplastic elastomer, butadiene rubber, etc., can be used, for example. The sealing resin 51 may preferably have a light-shielding effect so as to prevent external light from entering from the side surface.

The second wiring board 20 includes a recess C20 on the third surface 20SA. In the recess C20, a plurality of electronic components 40, for example, chip capacitors are housed. Each of the plurality of signal cables 60 is bonded to each of a plurality of bonding electrodes 22 provided on a back side of a side surface 20SS of the second wiring board 20.

As shown in FIG. 1, the image pickup unit 1 has a gate remnant 20G on the fourth surface 20SB located in a back area BA of the second wiring board 20. The back area BA is a back area when a front area FA and the back area BA are defined, with a surface, which divides a distance L between the third surface 20SA and the fourth surface 20SB into equal distances (0.5 L), as a boundary.

The second wiring board 20 is a molded interconnect device (MID) fabricated by injecting a resin into a mold. The second wiring board 20 includes, at a center of the fourth surface 20SB located in the back area, the gate remnant (gate cutting portion) 20G which is a part of a gate G20 (see FIG. 4) into which the resin is injected.

Figure 4:
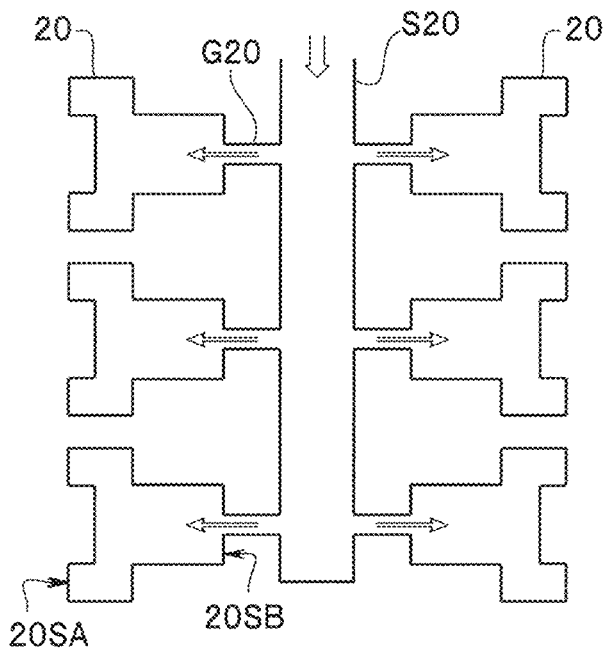
FIG. 4 is a view for describing a manufacturing method of an MID (molded interconnect device) of the image pickup unit according to the first embodiment.

As shown in FIG. 4, the second wiring board 20 is fabricated by an injection molding method. An MID resin is injected from a spool S20 into the mold (not shown) including the shape of the second wiring board 20, via the gate G20. Molded bodies, which are taken out from the mold, each to become the second wiring board 20 are connected by the spool S20 and the gates G20.

For example, the surface of each of the molded bodies made of the MID resin is irradiated with laser, to thereby form an area having a catalytic activity of electroless plating. After that, electroless plating processing is performed, and each of the molded bodies becomes the second wiring board 20 on which the third electrodes 21 and the bonding electrodes 22 are disposed. The plurality of second wiring boards 20 connected by the gates G20 are cut at the respective gates G20, to be singulated into the second wiring board 20. Therefore, the second wiring board 20 has the gate remnant 20G on the fourth surface 20SB.

Note that, in fabricating the second wiring board 20, laser irradiation and plating processing may be performed after the molded bodies are singulated. In addition, in the manufacturing method of the second wiring board 20, what is called, a two-time molding method in which different resins (a resin on which plating can be deposited and a resin on which plating cannot be deposited) are molded by using two molds may be used, or wiring may be formed by masking and selective plating.

As already described above, in some cases, the MID has an anisotropy such that structure is oriented depending on the direction in which the resin flows (flow direction) during the molding, and not only the mechanical property but also the thermal expansion coefficient (linear expansion coefficient) differ depending on the oriented direction.

The MID resin, for example, has a thermal expansion coefficient $\alpha 1$ in the flow direction that is greater than a thermal expansion coefficient $\alpha 2$ in the orthogonal direction. For example, in a case of a PEEK (polyetheretherketone) resin, the thermal expansion coefficient $\alpha 0$ of the isotropic body is 75 ppm, the thermal expansion coefficient $\alpha 1$ is 100 ppm/K, and the thermal expansion coefficient $\alpha 2$ is 50 ppm/K. In addition, in the case of LCP (liquid crystal polymer) with a structure based on p-Hydroxybenzoic acid, the thermal expansion coefficient $\alpha 0$ is 30 ppm, the thermal expansion coefficient $\alpha 1$ is 50 ppm/K, and the thermal expansion coefficient $\alpha 2$ is 15 ppm/K. The thermal expansion coefficients are measured based on JIS R 1618.

In contrast, the thermal expansion coefficient of the first wiring board 10 which is a ceramic wiring board is 15 ppm/K, for example. Note that the thermal expansion coefficient of the image pickup device 30 made of silicon is 4 ppm/K, for example.

The thermal expansion coefficient of the second wiring board 20 is different from that of the first wiring board 10. Therefore, a stress is applied to the bonding surface (solders 50) between the second wiring board 20 and the first wiring board 10 when the temperature changes.

Figure 5A:
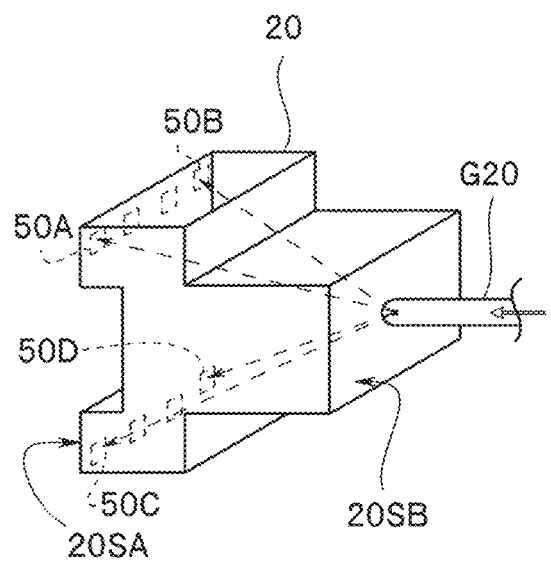
FIG. 5A is a perspective view for describing the manufacturing method of the MID of the image pickup unit according to the first embodiment.
Figure 5B:
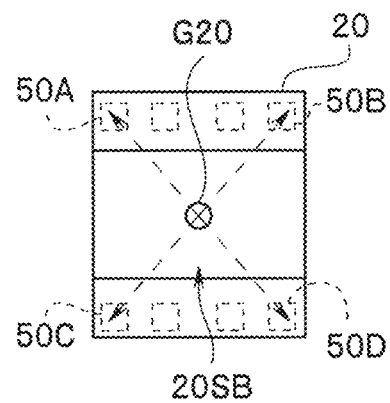
FIG. 5B is a rear view for describing the manufacturing method of the MID of the image pickup unit according to the first embodiment.

As shown in FIG. 5A and FIG. 5B, the second wiring board 20 has the gate G20 at the center of the fourth surface 20SB. In other words, the gate remnant 20G is arranged at a position farthest from the bonding portions 50A-50D (solders 50) at the outermost four corners of the third surface 20SA. That is to say, the distances from the respective bonding portions 50A to 50D at the four corners of the third surface 20SA to the gate remnant 20G are equal. In other words, among the plurality of bonding portions (solders 50) between the plurality of second electrodes 12 of the first wiring board 10 and the plurality of third electrodes 21 of the second wiring board 20, the four bonding portions 50A to 50D located at the outermost side have the same distance to the gate remnant 20G.

The bonding portions 50A to 50D at the four corners of the third surface 20SA are structurally susceptible to a stress. However, since the gate remnant 20G is apart from the four corners of the third surface 20SA, a pressure to be applied to the resin at the time of injection molding is small and it takes time for the resin to cool. Thus, the third surface 20SA has a small anisotropy in the thermal expansion coefficient.

The second wiring board 20 having the gate G20 at the center of the fourth surface 20SB is configured such that the anisotropies of the four corners of the third surface 20SA, which are structurally susceptible to the stress, can be minimized, and the variation of the anisotropies of the four corners can be reduced.

The position of the gate of the second wiring board 20 at the time of molding is set by taking the anisotropies into consideration. In other words, the thermal expansion coefficient of the third surface 20SA which is the bonding surface between the second wiring board 20 and the first wiring board 10 does not increase or vary due to the anisotropies.

If the second wiring board has no anisotropy, the maximum value of the difference between the thermal expansion coefficient of the second wiring board 20 and that of the first wiring board 10 becomes small. For example, if the second wiring board 20 (PEEK) has an anisotropy, the difference between the thermal expansion coefficient $\alpha 1$ of the second wiring board 20 and that of the first wiring board 10 (ceramic) is 85 ppm/K at the maximum. In contrast, if the second wiring board 20 has no anisotropy, the difference between the thermal expansion coefficient $\alpha 0$ of the second wiring board 20 and that of the first wiring board 10 is 60 ppm/K. Therefore, the stress to be applied to the bonding surface, which occurs when the temperature changes, is small. As a result, the image pickup unit 1 has high reliability.

Note that "no anisotropy" indicates that the percentage of the thermal expansion coefficient in the direction perpendicular to the third surface 20SA with respect to the thermal expansion coefficient in the in-plane direction of the third surface 20SA is greater than 70% and smaller than 130%, for example. If the anisotropy of the second wiring board 20 is within the above-described range, the reliability of the image pickup unit 1 is high.

Modifications of First Embodiment

Image pickup units 1A and 1B in first and second modifications of the first embodiment are similar to the image pickup unit 1 and have the same effects as those of the image pickup unit 1. Therefore, the same constituent elements having the same functions are attached with the same reference signs and descriptions thereof will be omitted.

First Modification of First Embodiment

Figure 6:
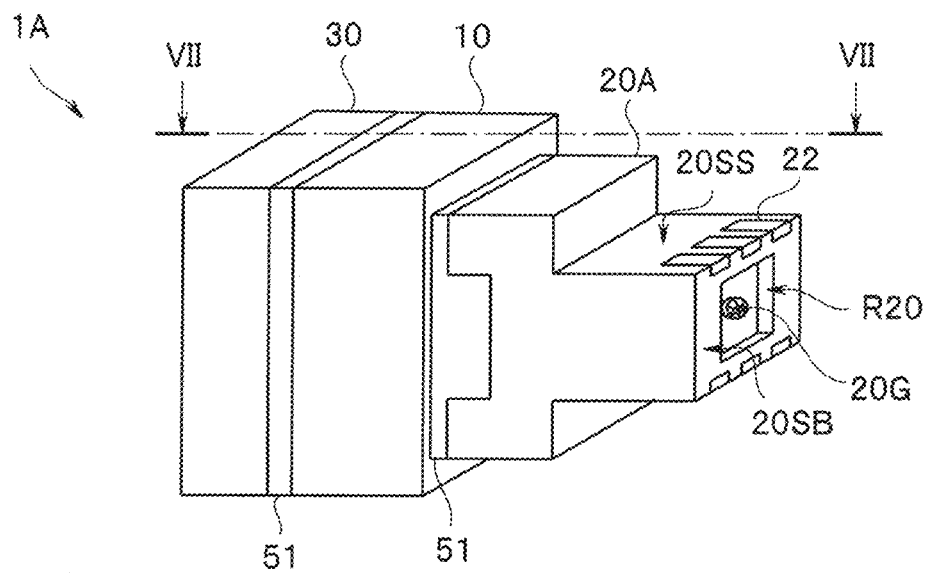
FIG. 6 is a perspective view of an image pickup unit according to a first modification of the first embodiment.
Figure 7:
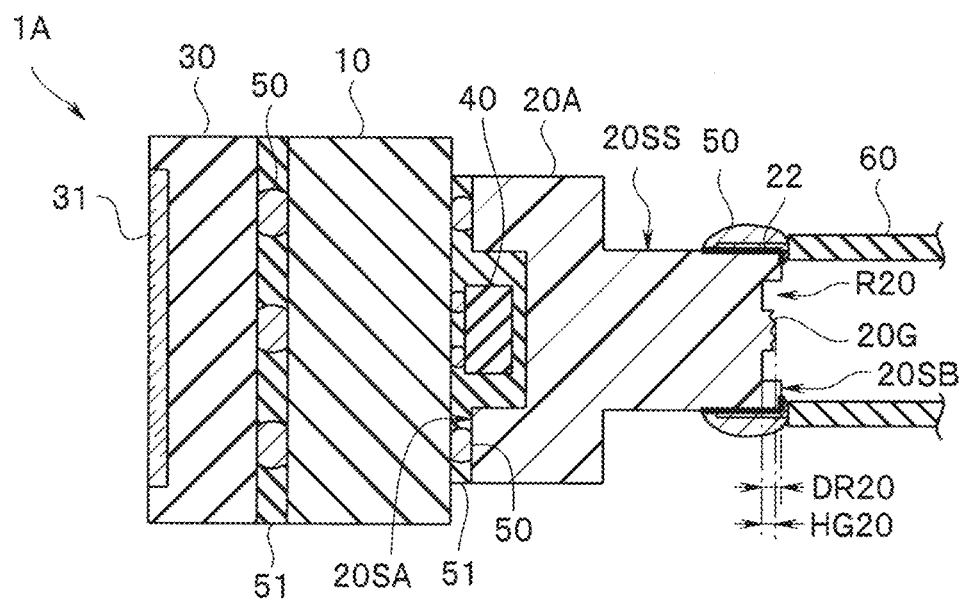
FIG. 7 is a sectional view taken along the line VII-VII in FIG. 6.

In the image pickup unit 1A according to the present modification shown in FIGS. 6 and 7, bonding electrodes 22 of a second wiring board 20A extend from a side surface 20SS to a fourth surface 20SB. Note that the signal cables 60 are not illustrated in FIG. 6. In addition, the second wiring board 20A includes a recess R20 on the fourth surface 20SB. A gate remnant 20G is located on a bottom surface of the recess R20.

With such a configuration, when cutting off the second wiring board 20A from the gate G20, that is, when performing gate cutting, even if the force of cutting off acts also on the bonding electrodes 22, the bonding electrodes 22 are protected by the walls of the recess R20, and there is no risk of damage on the bonding electrodes 22.

As shown in FIG. 7, a height HG20 from the bottom surface of the recess R20 of the gate remnant 20G is small with respect to a depth DR20 of the recess R20. In other words, the back side of the gate remnant 20G is located in the recess R20. For example, the depth DR20 of the recess R20 is 0.2 mm, and the height HG20 of the gate remnant 20G is 0.1 mm. In other words, the second wiring board 20A does not include a gate remnant 20G protruding from the fourth surface 20SB.

With such a configuration, when handling the image pickup unit 1A, a handling tool, a jig, and another tool do not contact the gate remnant 20G. Thus, handling of the image pickup unit 1A is easier than that of the image pickup unit 1. As a result, manufacturing of the image pickup unit 1A is easy.

Note that, at the time of gate cutting, the gate G20 may be completely removed, and a cutout may be formed at a part of the fourth surface 20SB. In other words, the gate remnant 20G may not be a part of the gate G20 (tangible object), but may be a trace (intangible object) indicating that there used to be the gate G20 here.

Second Modification of First Embodiment

Figure 8:
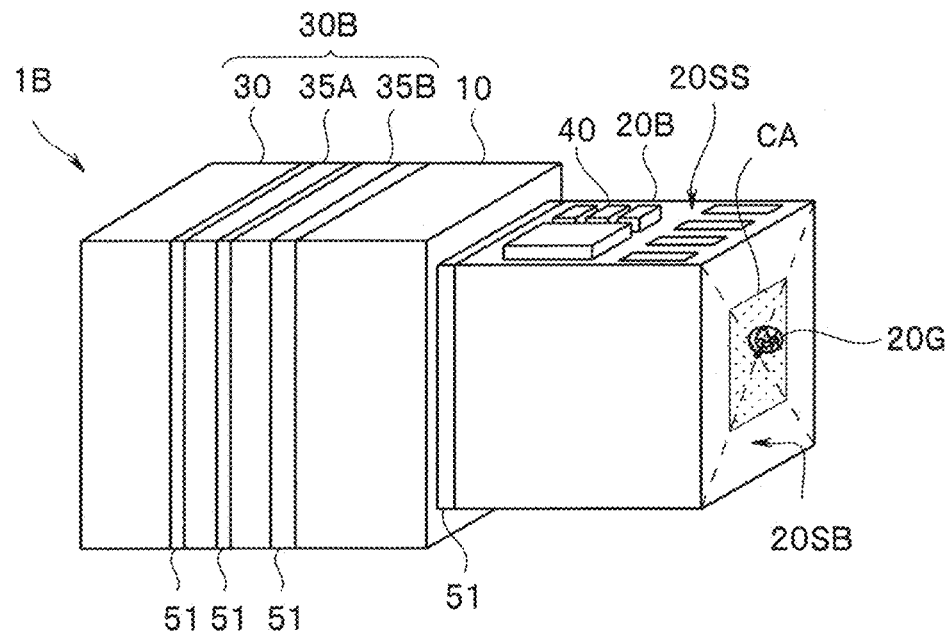
FIG. 8 is a perspective view of an image pickup unit according to a second modification of the first embodiment.

In an image pickup unit 1B of the present modification shown in FIG. 8, an image pickup device 30B is a stacked image pickup device 30B in which two semiconductor circuit elements 35A and 35B each having a semiconductor circuit that performs signal processing are bonded to a semiconductor image pickup device 30 including a light-receiving circuit. In the stacked image pickup device 30B, electrodes on a rear surface of the semiconductor circuit element 35B located on the back side of the stacked image pickup device 30 are external electrodes.

In addition, a second wiring board 20B has substantially a rectangular parallelepiped shape, and is not an irregularly-shaped wiring board. Electronic components 40 are mounted on a side surface 20SS of the second wiring board 20B. Furthermore, an MID resin of the second wiring board 20B includes a filler having a heat conductivity higher than that of a resin as a base material. Examples of a non-conductive filler having a heat conductivity higher than that of the resin include $SiO_2$, SiC, AlN, ZnO, $Si_3N_4$, BN, and $Al_2O_3$.

The resin including the filler exhibits, in some cases, a greater anisotropy in the thermal expansion coefficient depending on the flow direction than the resin that does not include the filler. However, the second wiring board 20B includes a gate remnant 20G at the center of a fourth surface 20SB, and thereby has no anisotropy.

The second wiring board 20B of the image pickup unit 1B includes the filler having the high heat conductivity, to thereby make it easy to dissipate heat generated by the image pickup device 30 and the like via a cable 60 and the like.

With such a configuration, reliability of the image pickup unit 1B is higher than that of the image pickup unit 1.

The second wiring board 20B includes the gate remnant 20G at the center of the fourth surface 20SB. However, as shown in FIG. 8, the second wiring board 20B may include the gate remnant 20G in a center area CA of the fourth surface 20SB. The center area CA indicates an area located at a center side with respect to lines composed of a plurality of points each bisecting each of a plurality of linear lines connecting the center and the outer edges of the fourth surface 20SB. The second wiring boards 20 and 20A may also include the gate remnant 20G in the center area CA of the fourth surface 20SB.

Second Embodiment

As described above, each of the second wiring boards 20, 20A, and 20B includes the gate remnant 20G at substantially the center of the fourth surface 20SB such that no anisotropy occurs.

Figure 9:
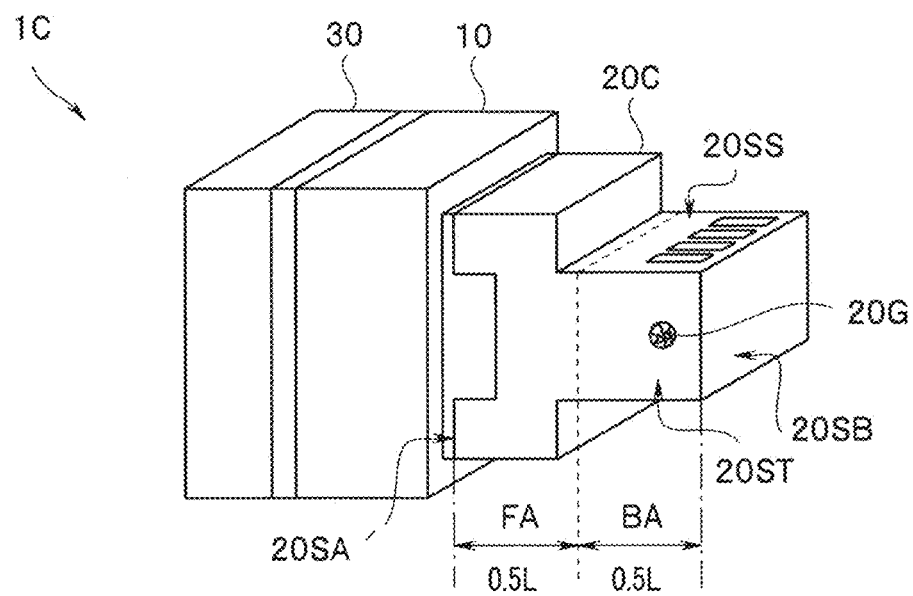
FIG. 9 is a perspective view of an image pickup unit according to a second embodiment.

As shown in FIG. 9, an image pickup unit 1C of the present embodiment includes a gate remnant 20G in a back area BA of a side surface 20ST of a second wiring board 20C. The side surface 20ST which is a fifth surface intersecting the fourth surface 20SB is orthogonal to a side surface 20SS. The back area BA is a back area when a front area FA and the back area BA are defined, with a surface, which divides a distance L between a third surface 20SA and a fourth surface 20SB into equal distances (0.5 L), as a boundary.

Since the second wiring board 20C includes the gate remnant 20G in the back area BA, an anisotropy in the thermal expansion coefficient is less likely to occur in the second wiring board 20C than in the second wiring board including the gate remnant 20G on the front side thereof. This prevents a difference between the thermal expansion coefficient of the second wiring board 20C and that of the first wiring board 10 from becoming large.

Therefore, reliability of the image pickup unit 1C including the gate remnant 20G in the back area BA of the second wiring board 20C is higher than that of the image pickup unit including the gate remnant 20G on the front side of the second wiring board 20.

Note that it is needless to say that the second wiring board may include a recess in the back area BA of a side surface of the second wiring board, and may include the gate remnant 20G on the bottom surface of the recess, as in the second wiring board 20A.

Third Embodiment

Figure 10:
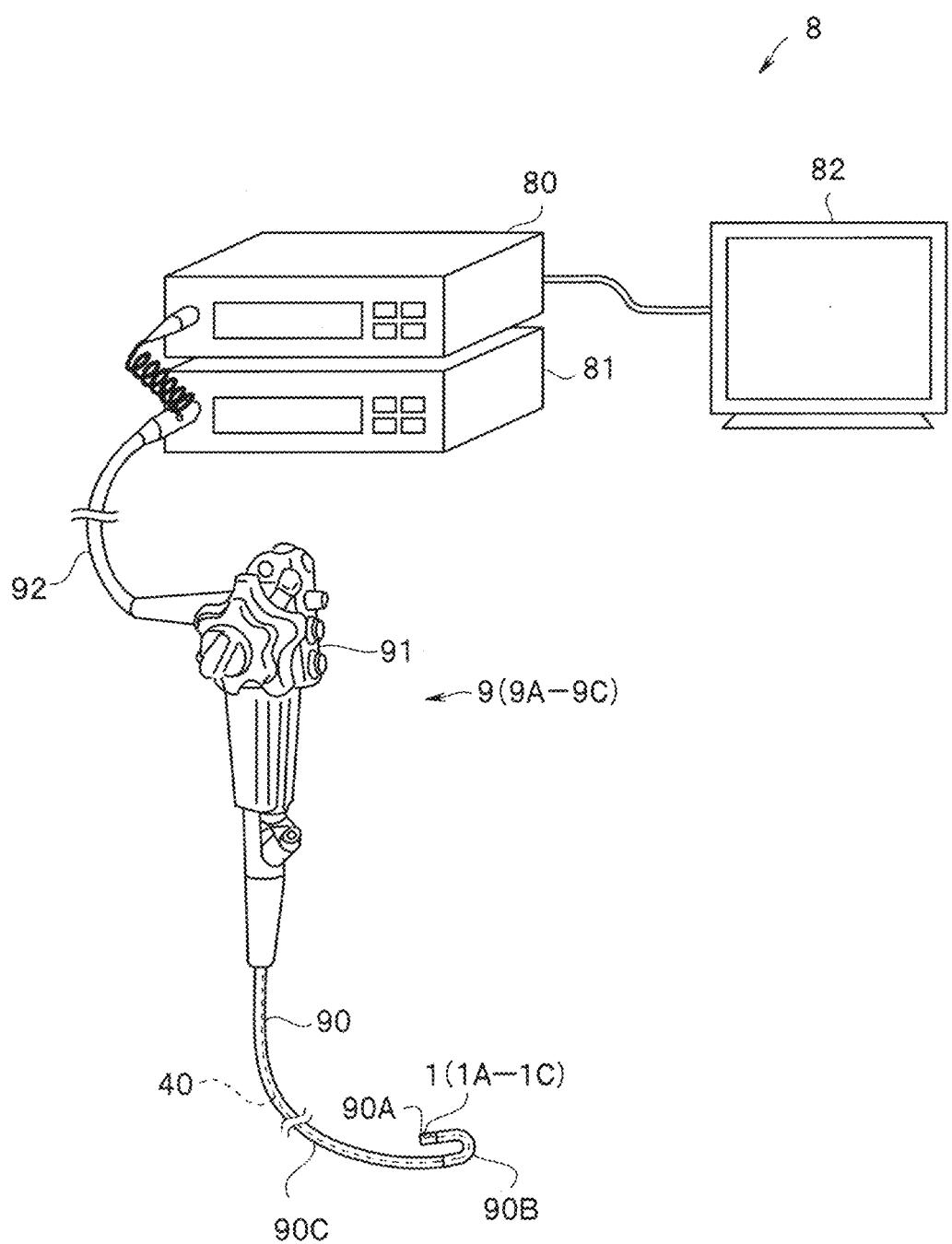
FIG. 10 is a configuration view of an endoscope system including an endoscope according to a third embodiment.

An endoscope system 8 as shown in FIG. 10 includes an endoscope 9 according to the present embodiment, a processor 80, a light source apparatus 81, and a monitor 82. The endoscope 9 includes an insertion portion 90, an operation portion 91, and a universal cord 92. The endoscope 9 is configured such that the insertion portion 90 is inserted into a body cavity of a subject, to photograph an in-vivo image of the subject, and output an image signal.

The insertion portion 90 includes a distal end portion 90A in which any of the image pickup unit 1 to 1C is disposed, a bendable bending portion 90B connected continuously with the distal end portion 90A, and a flexible portion 90C connected continuously with the bending portion 90B. The bending portion 90B is configured to bend by the operation portion 91 being operated.

The endoscope 9 includes, at a proximal end portion of the insertion portion 90, the operation portion 91 on which various kinds of buttons for operating the endoscope 9 are provided.

The light source apparatus 81 includes a white LED, for example. Illumination light emitted by the light source apparatus 81 is guided to the distal end portion 90A, via a light guide (not shown) passing through the universal cord 92 and the insertion portion 90, to illuminate an object.

The universal cord 92 is connected to the processor 80. The processor 80 controls the whole of the endoscope system 8, performs signal processing on the image pickup signal outputted by the image pickup unit 1, to output the image pickup signal subjected to the signal processing, as an image signal. The monitor 82 displays the image signal outputted from the processor 80 as an endoscopic image.

As described above, the image pickup unit 1 (1A to 1C) has high reliability. As a result, the endoscope 9 (9A to 9C) including any of the image pickup units 1 to 1C has also high reliability.

Note that the endoscope 9 is a flexible endoscope for medical use, but the endoscope of the present disclosure may be a rigid endoscope, and may be used for an industrial purpose. The endoscope 9 may be an industrial endoscope configured such that the insertion portion 90 is connected directly to the monitor 82.

The present disclosure is not limited to the above-described embodiments, and the like, but various changes, modifications, etc., are possible without changing the gist of the present disclosure.

What is claimed is:

1. An image pickup unit comprising:
an image pickup device including a light-receiving surface located on a front side and a rear surface located on a back side, and a plurality of external electrodes disposed on the rear surface;
a first wiring board including a first surface located on a front side and a second surface located on a back side, the first wiring board including a plurality of first electrodes disposed on the first surface, and a plurality of second electrodes disposed on the second surface, the plurality of first electrodes being bonded respectively to the plurality of external electrodes; and
a second wiring board including a third surface located on a front side and a fourth surface located on a back side, the second wiring board including a plurality of third electrodes disposed on the third surface, and a gate remnant located in a back area of the second wiring board, the plurality of third electrodes being bonded respectively to the plurality of second electrodes.

2. The image pickup unit according to claim 1, wherein the back area of the second wiring board is a back side area, when a front side area and a back side area are defined, with a surface located at an equal distance from the third surface and the fourth surface, as a boundary.

3. The image pickup unit according to claim 2, wherein the gate remnant is located in the fourth surface which is parallel to the third surface.

4. The image pickup unit according to claim 3, wherein the gate remnant is located in a center area of the fourth surface which is parallel to the third surface.

5. The image pickup unit according to claim 2, wherein among a plurality of bonding portions between the plurality of second electrodes of the first wiring board and the plurality of third electrodes of the second wiring board, four bonding portions arranged at an outermost side have an equal distance from the gate remnant.

6. The image pickup unit according to claim 4, wherein the fourth surface includes a recess, and
the gate remnant is located on a bottom surface of the recess.

7. The image pickup unit according to claim 6, wherein a back side of the gate remnant is located in the recess.

8. The image pickup unit according to claim 2, wherein the second wiring board includes a fifth surface intersecting the fourth surface, and
the gate remnant is located on the fifth surface.

9. The image pickup unit according to claim 2, wherein the second wiring board is a molded interconnect device.

10. The image pickup unit according to claim 2, wherein the plurality of third electrodes are solder-bonded respectively to the plurality of second electrodes.

11. The image pickup unit according to claim 2, wherein the second wiring board is an irregularly-shaped wiring board in which the fourth surface is smaller than the third surface.

12. The image pickup unit according to claim 2, wherein the second wiring board has a thermal expansion coefficient different from a thermal expansion coefficient of the first wiring board.

13. The image pickup unit according to claim 1, wherein the second wiring board does not have an anisotropy in a thermal expansion coefficient.

14. An endoscope comprising:
an insertion portion configured to be inserted into a subject; and
an image pickup unit provided at a distal end portion of the insertion portion;
the image pickup unit comprising:
an image pickup device including a light-receiving surface located on a front side and a rear surface located on a back side, and a plurality of external electrodes disposed on the rear surface;
a first wiring board including a first surface located on a front side and a second surface located on a back side, the first wiring board including a plurality of first electrodes disposed on the first surface, and a plurality of second electrodes disposed on the second surface, the plurality of first electrodes being bonded respectively to the plurality of external electrodes; and
a second wiring board including a third surface located on a front side and a fourth surface located on a back side, the second wiring board including a plurality of third electrodes disposed on the third surface, and a gate remnant located in a back area of the second wiring board, the plurality of third electrodes being bonded respectively to the plurality of second electrodes.

* * * * *